US005230253A

United States Patent [19]

Blough, Jr. et al.

[11] Patent Number: 5,230,253

[45] Date of Patent: Jul. 27, 1993

[54] FLUID MIXING DEVICE

[75] Inventors: William M. Blough, Jr., Brea; Jack J. Keegan, La Habra, both of Calif.

[73] Assignee: Beckman Instruments, Inc., Fullerton, Calif.

[21] Appl. No.: 869,197

[22] Filed: Apr. 13, 1992

Related U.S. Application Data

[63] Continuation of Ser. No. 483,599, Feb. 22, 1990, abandoned.

[51] Int. Cl.[5] .......................... G01N 1/28; B01F 3/00

[52] U.S. Cl. ................................ 73/864.85; 137/896; 137/597; 366/173; 366/341

[58] Field of Search ........................ 73/864.81–864.87, 73/864.91, 863; 137/597, 896, 897, 898; 366/341, 140, 167–175

[56] References Cited

U.S. PATENT DOCUMENTS

| | | | |
|---|---|---|---|
| 410,597 | 9/1889 | Knight | 137/597 |
| 1,196,595 | 8/1916 | Sharpe | 366/173 X |
| 2,082,299 | 6/1937 | Nonhebel et al. | 73/864.91 X |
| 2,139,871 | 12/1938 | Wilson et al. | 366/173 X |
| 3,230,972 | 1/1966 | Davis, Jr. | 137/896 |
| 3,332,442 | 7/1967 | Reed | 137/896 |
| 3,502,103 | 3/1970 | Verschuur | 137/896 X |
| 3,564,925 | 2/1971 | Divelbiss et al. | 73/864.85 |
| 3,566,698 | 3/1971 | Sheppard | 73/864.85 |
| 3,867,195 | 2/1975 | Pfeuffer | 127/22 |
| 4,035,168 | 7/1977 | Jennings | 73/23.35 X |
| 4,087,496 | 5/1978 | Perrot | 261/93 |
| 4,263,926 | 4/1981 | Drake et al. | 137/896 X |
| 4,274,749 | 6/1981 | Lake et al. | 137/896 X |
| 4,345,841 | 8/1982 | Day | 366/341 X |
| 4,647,212 | 3/1987 | Hankison | 366/173 X |
| 4,888,998 | 12/1989 | Buzza et al. | 73/864.21 |
| 4,895,452 | 1/1990 | Yiournas et al. | 366/173 |
| 5,026,168 | 6/1991 | Berryman et al. | 366/171 X |

FOREIGN PATENT DOCUMENTS

| | | | |
|---|---|---|---|
| 678957 | 9/1966 | Belgium . | |
| 971250 | 12/1958 | Fed. Rep. of Germany | 366/173 |
| 2318831 | 2/1973 | France . | |
| 67004 | 8/1973 | Luxembourg . | |
| 195895 | 2/1938 | Switzerland | 366/173 |
| 909865 | 11/1962 | United Kingdom . | |
| 979675 | 1/1965 | United Kingdom . | |
| 1193350 | 5/1970 | United Kingdom | 366/173 |
| 1358808 | 7/1974 | United Kingdom | 73/864.91 |
| 2096911 | 10/1982 | United Kingdom . | |

OTHER PUBLICATIONS

15610 "Nonmechanical Shearing Mixer"; *Research Disclosure,* No. 156, pp. 14–15, Apr. 1977; disclosed by W. Johonnes; in 366/173.

"Ceramic Pressure Device for Proparation of Known Gas Concentrations at the 100 Parts per Million Level"; *Analytical Chemistry;* vol. 43, No. 3; Mar. 1971 (1 page) Herman D. Axelrod et al.

*Primary Examiner*—Tom Noland

*Attorney, Agent, or Firm*—William H. May; Gary T. Hampson; Charles Berman

[57] ABSTRACT

An improved fluid mixing device comprising a mixing chamber having end walls and a cylindrical side wall. A first fluid conduit joins the mixing chamber at a first port formed in the first end. A second fluid conduit joins the mixing chamber at a second port formed in the side wall. A second fluid conduit is angled with respect to the mixing chamber to direct fluid flow from the conduit through the second port generally along the wall of the mixing chamber to create a rapid vortexing action. A third conduit joins the mixing chamber at a third port in the second end. A fourth conduit intersects the third conduit, the center lines of the third and fourth conduits offset at the area of intersection.

45 Claims, 2 Drawing Sheets

FLUID MIXING DEVICE

This is a continuation of co-pending application Ser. No. 07/483,599 filed on Feb. 22, 1990 and now abandoned.

BACKGROUND

The present invention relates to the field of fluid handling devices and more particularly to an improved fluid mixing device. Still more particularly the fluid mixing device may be adapted for use in mixing liquids used in automated clinical chemistry analyzers.

A common requirement in fluid handling systems is the mixing of two fluid flows to form a third fluid flow. For example, automated clinical chemistry analyzers frequently require two fluid flows to be mixed together to form a third fluid flow that is then analyzed. A first fluid may be, for example, a patient sample such as serum, plasma, urine or spinal fluid (CSF). The second fluid may be a buffer which, when combined with the first fluid, controls primarily the pH, ionic strength and surfactant properties of the resulting mixture.

One such system requiring the combination of two fluid flows is the SYNCHRON CX ®3 automated clinical chemistry analyzer which is commercially available from Beckman Instruments, Inc. (Brea, Calif. 92621). In this system, a probe carrying the patient sample is aligned above a sample injection cell. The probe is lowered into the cell with the tip of the probe coming to rest within a mixing chamber. The sample is pumped from the probe into the mixing chamber while a buffer solution is pumped through a separate conduit into the mixing chamber. The resulting mixture flows from the mixing chamber through an exit conduit to an electrolyte measuring flow cell to measure sodium, potassium, chloride and $CO_2$. An essentially identical system is disclosed in U.S. Pat. No. 4,888,998, issued Dec. 26, 1989, which is incorporated herein by reference.

A cutaway side view of the mixing chamber in such commercially available system is illustrated in FIG. 5. As seen with reference to FIG. 5, a mixing chamber 100 includes a vertical conduit 108 which is adapted to receive a probe 102 having a tip 104. A conduit 106 is "T"-ed into the side of and is perpendicular to the conduit 108. The conduit 106 is connected to a source of buffer which is to mix with sample ejected through the probe tip 104. An exit conduit 110 forms a right angle with the conduit 108 to draw the combined sample and buffer from the mixing chamber 100.

Unfortunately, the "T" configuration of the prior art system may impede mixing of the sample and buffer for several reasons. As the sample flow from the tip 104 meets the buffer flow from the conduit 106, the flows may simply combine without mixing, resulting in laminar, separate flows within the conduits 108 and 110. The degree of laminar, separate flow is influenced by the vertical position of the tip 104 within the conduit 108, thus making the system sensitive to routine changes in probe tip position that occur, for example, due to normal wear and tear and routine replacement of the probe 102. Further, an air bubble may be trapped directly below the tip 104 within the flow of sample from the tip 104. Such an air bubble vibrates rapidly within the conduit 108, resulting in pulses or bursts of sample within the flow of buffer. Also, air trapped above the conduit 106, while not causing pulses or bursts in the combined flow, does gradually break up, flowing to the flow cell where such disbursed air can collect, adversely affecting measurements.

One result of these limitations and drawbacks may be inconsistent electrolyte measurements and adversely affected average precision. Thus, there is a need for improved fluid mixing to improve and stabilize the performance of the measurement system.

The improved fluid mixing device of the present invention overcomes the limitations noted in the prior device. The improved fluid mixing device may be formed directly in the sample injection cell and, more particularly, may replace the mixing chamber found in the prior art sample injection cell. In accordance with the present invention, the improved fluid mixing device includes a mixing chamber having a cylindrical side wall, end walls and a major axis parallel to and coaxial with the cylindrical side wall. A first fluid conduit joins the mixing chamber at a first fluid port formed in one of the end walls. A second fluid conduit joins the mixing chamber at a second fluid port, the second port being formed in the cylindrical side wall. The second fluid conduit and second fluid port are offset with respect to the major axis to direct a fluid flow from the second conduit through the second port generally along the side wall and around the major axis of the mixing chamber, creating a swirling action within the mixing chamber. A third fluid conduit joins the mixing chamber at a third port in the other end and serves as an exit conduit for the fluids mixed in the mixing chamber.

In the embodiment of the invention disclosed herein, the mixing chamber may form a first stage of a mixing device or configuration. A second stage includes positioning the third port off-center in the second end and generally aligning the third fluid conduit with the major axis. Yet a third stage of the mixing device or configuration disclosed herein may include a fourth conduit intersecting the third conduit. Center lines of the third and fourth conduits are offset and do not intersect.

In as preferred form of the invention, the second conduit is offset at less than a tangent with respect to the mixing chamber. This causes fluid flow to be directed from the second conduit through the second port partially toward the internally extended portion of the first fluid conduit to thereby create a turbulent swirling action.

In overall effect, the improved fluid mixing device of the present invention thoroughly and completely mixes the two streams of inlet fluids. When used in the sample injection cell of the automated clinical chemistry system described above, the improved mixing results in more consistent performance and better average precision in the measurement of electrolytes.

DETAILED DESCRIPTION

Figure 1:
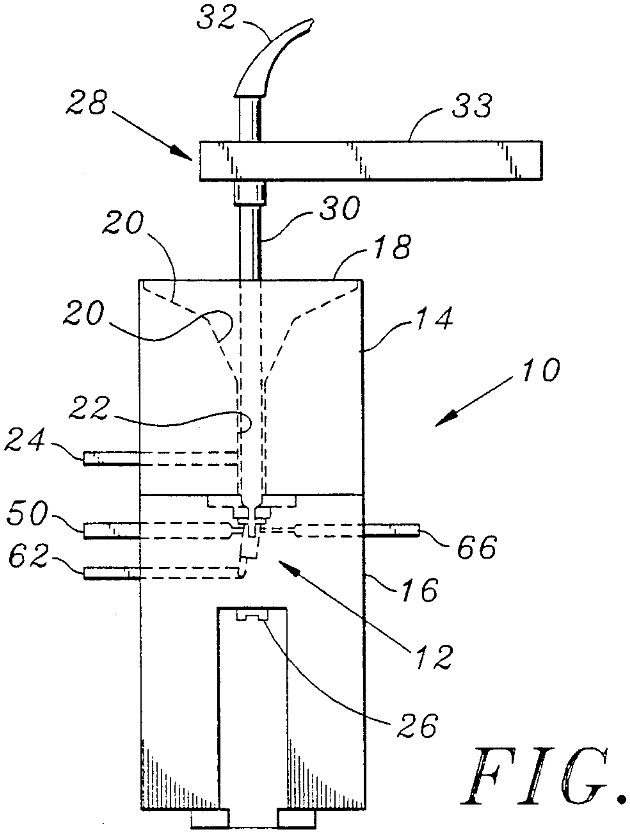
FIG. 1 is an overall exterior view of a sample injection cell including an improved mixing device or configuration in accordance with the present invention as well as a sample probe.

With reference to FIG. 1, a sample injection cell 10 may include an improved fluid mixing device or configuration 12 in accordance with the present invention. The sample injection cell 10 is generally a vertical cylinder and may be formed from cast acrylic. The cell 10 includes an upper portion 14 and a lower portion 16. The upper portion 14 includes an open end 18 and tapered surfaces 20 leading to a vertical central cylindrical bore 22. A horizontal conduit 24 leads to and is in communication with the bore 22. The lower portion 16 includes the mixing configuration 12 more particularly described with reference to FIGS. 2-4 below. The upper and lower portions 14 and 16 are joined by, for example, screws 26 (only one of which is shown in FIG. 1).

A sample probe assembly 28 includes a fluid carrying conduit 30 which may be attached via a hose 32 to pumps, for example, for aspirating sample from sample containers (not shown) and discharging the aspirated sample into the cell 10. The probe assembly 28 includes an arm 33 connected to a probe assembly positioning device, all of which is well-known in the art. The probe assembly 28 and cell 10, but for the mixing configuration 12 of the present invention, may be as used in the prior art commercially available SYNCHRON CX®3 Clinical System described above and is otherwise well-known in the art.

Figure 2:
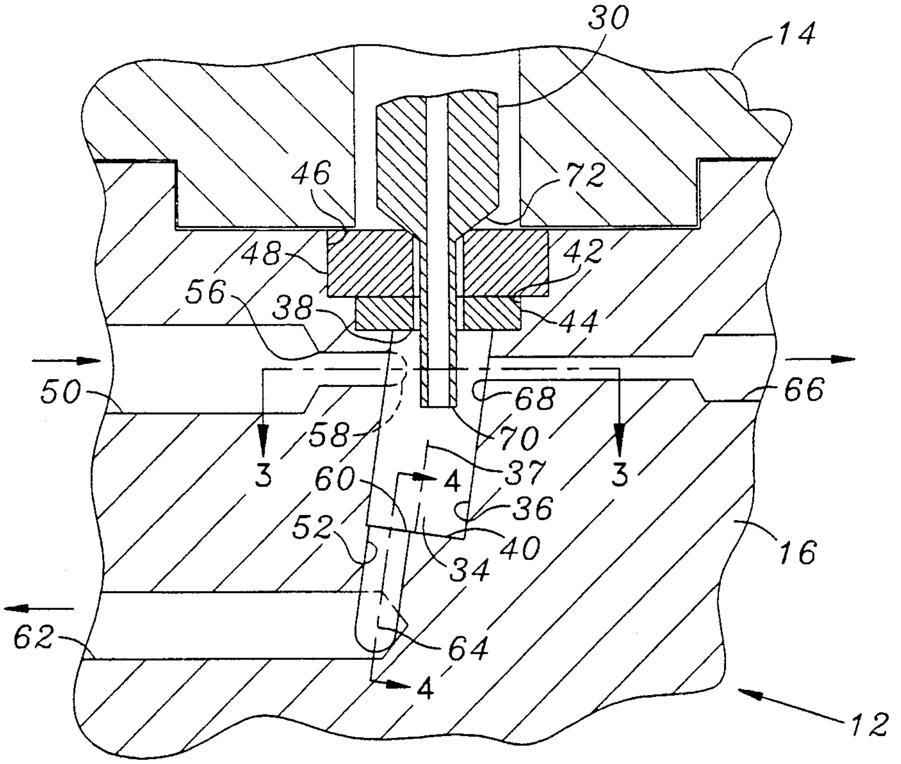
FIG. 2 is an enlarged partial cross-section view of the improved fluid mixing configuration of the injection cell of FIG. 1.

Turning now to the improved fluid mixing device or configuration 12 as seen in FIG. 2, the configuration 12 includes a mixing chamber 34 having a cylindrical side wall 36 and upper and lower ends 38, 40, respectively. The cylindrical wall 36 of the mixing chamber 34 includes a major central coaxial axis 37. The axis 37 is inclined slightly with respect to vertical and, in the embodiment disclosed herein, is inclined approximately 8.5 degrees. The end 40 is perpendicular to the axis 37 and the upper end 38 is angled slightly from the axis 37 to be generally horizontal (as seen in FIG. 2). Particularly, the upper end 38 is angled about 81.5 degrees from the axis, bringing the end 38 to its generally horizontal position as just described.

A slightly enlarged bore 42 immediately above the end 38 receives and supports a rigid washer 44. A second slightly enlarged bore 46 immediately above the bore 42 receives and holds a quad ring 48. The quad ring 48 is retained within the bore 46 by clamping pressure applied via the upper portion 14. The quad rind 48 provides a seal between the upper portion 14 and lower portion 16 and, as is described below, provides a seal between the removable probe conduit 30 and the mixing configuration 12.

The probe conduit 30 may be considered a first fluid conduit when the probe is positioned as shown in FIG. 2 with the probe seated against the quad ring 48. The probe conduit 30 or first fluid conduit enters the mixing chamber 34 through the upper end 38 and is angled, in the embodiment disclosed herein, approximately 8.5 degrees with respect to the major axis 37.

Figure 3:
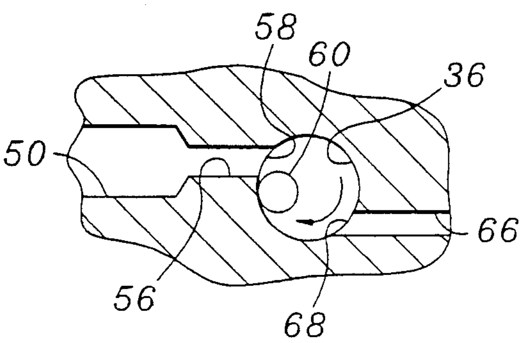
FIG. 3 is a partial cross-section view taken along line 3—3 of FIG. 2 with the probe removed for clarity.

A second fluid conduit 50 (FIGS. 2 and 3) is in communication with the mixing chamber 34. The second fluid conduit 50 narrows to include a reduced portion 56 proximate the mixing chamber 34 and enters the mixing chamber 34 via a port 58. The conduit 50 including the reduced portion 56 is offset with respect to the axis 37 and enters the mixing chamber 34 off-center as illustrated in FIG. 3 such that fluid flow through the port 58 is directed substantially around the axis 37 and along the cylindrical wall 36.

A third fluid conduit 52 exits mixing chamber 34 through the lower end 40 via a port 60. A center line of the conduit 52 is generally parallel to the axis 37 of the mixing chamber 34.

Figure 4:
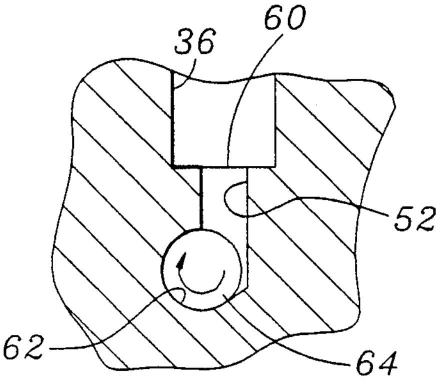
FIG. 4 is a partial cross-section view taken along line 4—4 of FIG. 2.

A fourth fluid conduit 62 is in communication with the lower end of the fluid conduit 52. The center line of the conduit 62, as seen in FIG. 4, is offset with respect to the center line of the conduit 52 and is slightly displaced such that the center line of the conduit 62 falls substantially at the periphery or is tangential with respect to the wall of the conduit 52. The conduits 52 and 62 are joined at an intersection identified generally at 64.

A drain conduit 66 (FIGS. 2 and 3) is also in communication with the mixing chamber 34 at a port 68. The drain conduit 66 is offset with respect to the axis 37 and is generally horizontal as seen in FIG. 2. The port 68 is located near the upper end 38 to help reduce the amount of air that may otherwise become trapped at the top of the mixing chamber 34.

In operation (FIGS. 1-4), the probe assembly 28 is inserted into the cell 10 with probe tip 70 coming to rest within the mixing chamber 34. A tapered surface 72 formed on the outside of the conduit 30 and proximate the tip 70 is urged against the quad ring 48, sealing the tip 70 within the mixing chamber 34. Fluid sample, which may be in the form of liquid patient serum, is held within the probe conduit 30. The conduit 50 is connected to a source of fluid, such as liquid buffer as described above.

With the probe tip 70 positioned within the mixing chamber 34, pumping means (not shown) are operated to eject the serum sample from the probe conduit 30 into the mixing chamber. Simultaneously, pumping means pumps diluent or buffer via the fluid conduit 50 through the port 58 into the mixing chamber 34. Advantageously, the stream formed by the buffer entering the mixing chamber 34 creates a rapid fluid vortexing action about the axis 37 within the chamber 34. Interference by the probe conduit 30 in the flow from the conduit 50 and port 58 prevent a coherent vortex or cyclone from forming within the mixing chamber 34, introducing turbulence into the vortex to help prevent the sample from becoming trapped within the center of the vortex. Gas bubbles which generally collect between the port 58 and the rigid washer 44 are immediately sweep away by this rapid vortexing fluid action within the mixing chamber 34.

As seen in FIG. 2, the probe conduit 30, which may also be considered as a first fluid conduit, is generally vertical and is thus angled slightly (in the embodiment disclosed, about 8.5 degrees) with respect to the axis 37. The angle difference directs the fluid flow from the conduit 30 toward the lower bottom corner of the mixing chamber 34 and into the rapidly circulating or spinning wall or side of the fluid vortex created within the mixing chamber 34. The fluid flow from the conduit 30 is not injected into the center of the vortex created within the mixing chamber 34 where it might otherwise become entrapped, decreasing the mixing action. The result is a thorough and rapid mixing of the two fluids within the mixing chamber 34.

The fluids continue their vortexing action, and are forced through the port 60 into the fluid conduit 52. At the interface formed by the port 60 between the mixing chamber 34 and the conduit 52, further turbulence is created. The port 60 in effect slices off the advancing rapidly vortexing fluid within the mixing chamber 34. This slicing, rotation-inducing action creates further mixing and in turn creates a vortexing or rotational fluid action or movement within the conduit 52. At the intersection 64, the rotating column of fluid moving through the fluid conduit 52 is again subject to not only a change in direction but a further change in rotation, the advancing fluid creating yet another rotational or vortexing action within the conduit 62.

Stated somewhat differently, the mixing configuration 12 may be considered as including three distinct mixing stages. The first stage comprises the mixing chamber 34 in which the rapid vortexing and injection action between first and second fluid flows is created. The second stage includes the port 60 which "slices" this rapidly rotating fluid mass as the mass advances from the mixing chamber 34 into the fluid conduit 52. The intersection 64 and the conduit 62 form yet a third mixing stage, with the change in direction of the fluid mass as well as the creation of yet another vortexing or rotational effect within the conduit 62 yet further enhancing the mixing action of the configuration 12.

Once sample injection and mixing is completed as just described the probe 30 may be raised slightly, wash fluid introduced via the conduit 24 with the drain conduit 66 operating to aspirate or drain the wash fluid from the sample cell 10.

The second conduit 50 is offset at less than a tangent with respect to the mixing chamber 34. By "less than a tangent" it is meant that the wall of the reduced portion 56 is not tangent with the cylindrical side wall 36 and is instead displaced toward the central axis 37 of the cylindrical wall 36 (FIGS. 2 and 3). Fluid flow from a second conduit 50 is directed through the second port 58 partially toward the internally extended portion of the first fluid conduit 30 to thereby create a turbulent swirling action.

Figure 5:
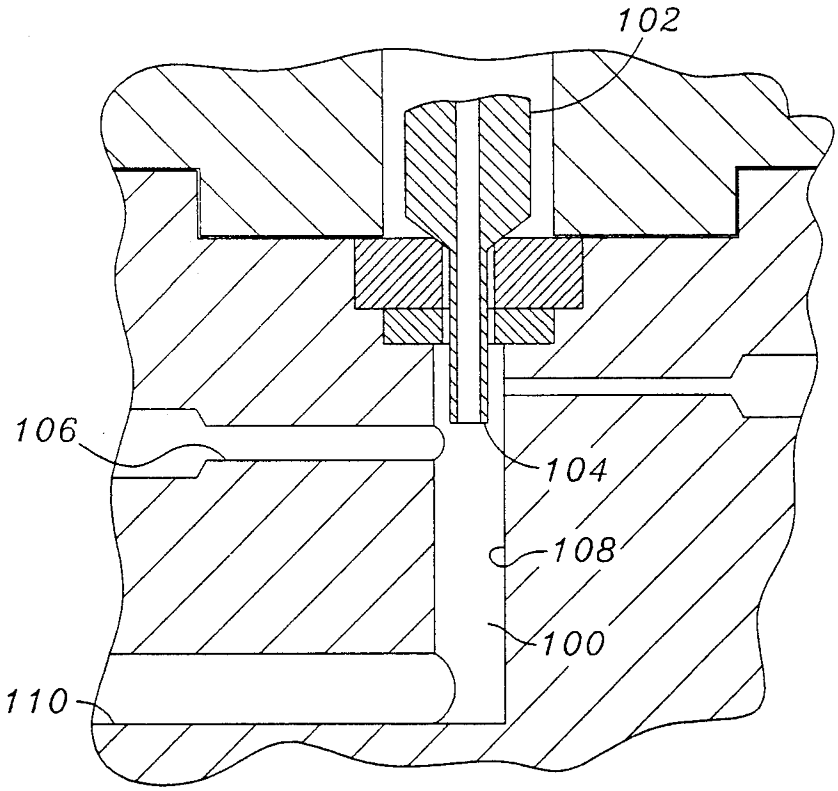
PRIOR ART FIG. 5
FIG. 5 is a partial cross-section view of a mixing chamber of a prior-art sample injection cell.

The present invention provides significant improvements over the prior-art system described in the Background. The placement of the port 58 near the upper end 38 and flow of fluid from port 58 parallel to the upper end 38 substantially reduces the volume of air that could be trapped with the mixing chamber 34. The rapid vortexing action created within the chamber 34 rapidly and completely sweeps any trapped air from the chamber 34. This action passes entrapped air through the electrolyte measuring flow cell before measurements are made and eliminates air that might otherwise become trapped in the flow from the conduit 30, leading to bursts or pulses of sample entrained within the buffer flow. Further, the rapid vortexing action within the chamber 34, as well as the mixing occurring at the port 60 and intersection 64 eliminates laminar flow otherwise present in the prior-art system. The mixing distance of the prior-art system in FIG. 5, that is, the linear length of the fluid travel within the conduits 108, 110 through which mixing may occur before the fluid leaves the cell is effectively many times multiplied by the vortexing, sectioning and rotational actions created by the mixing configuration 12.

Thus, the mixing device or configuration 12 of the present invention overcomes the limitations of the prior art, providing rapid, sure, effective mixing without substantial increased costs or external parts.

It is to be recognized that modifications to the present invention are possible to accommodate varying liquid viscosities and flow rates. For example, the flow rate of fluid from the port 58 may be effected by the diameter of the reduced portion 56 and the speed at which fluid rotates within the mixing chamber can be altered by the amount by which the port 58 is offset from the axis 37. Further, the conduit 30 and end 70 may be replaced by a conduit entering the mixing chamber 34 through a port formed in the end 38. In such an instance, such a port and conduit should direct the fluid flow into the fluid wall or side of the spinning fluid vortex to accomplish rapid, thorough mixing. Such modifications and others may be developed through routine experimentation where high "shutter" speed video recording may be used to assist in the evaluation of such modifications.

It will be further recognized by those skilled in the art that the present invention is not to be limited to the particular embodiment disclosed herein but is to be afforded the full scope of the claims appended hereto.

We claim:

1. An improved fluid mixing device comprising:

a mixing chamber having opposing end walls, a generally cylindrical side wall, and an axis coaxial with the cylindrical side wall;

a first fluid conduit joining the mixing chamber at a first fluid port, the first fluid port being in one of the end walls and wherein the first conduit is angled the first conduit toward the side wall;

a second fluid conduit joining the mixing chamber at a second fluid port formed in the cylindrical side wall, the second fluid conduit offset with respect to the mixing chamber to direct a fluid flow from the second conduit through the second port along the side wall of the mixing chamber and around the mixing chamber axis to thereby create a swirling action as fluid is injected into the mixing chamber from the second conduit; and a third fluid conduit joining the mixing chamber at a third port in the opposite end wall.

2. A device as in claim 1 wherein the third conduit is generally parallel to the mixing chamber axis.

3. A device as in claim 1 wherein the third port is offset with respect to the axis of the opposite end wall.

4. A device as in claim 1 including a fourth conduit intersecting the third conduit, center lines of the third and fourth conduit being offset.

5. A device as in claim 1 wherein the first conduit includes an extending portion that extends into the mixing chamber and the first port is at an end of the extending portion.

6. A device as in claim 5 wherein the first conduit is angled with respect to the mixing chamber axis to direct fluid from the first conduit toward the side wall.

7. A device as claimed in claim 1 wherein the second conduit is offset at less than a tangent with respect to the mixing chamber to direct a fluid flow from the second conduit through the second port partially toward an internally extended portion of the first fluid conduit to thereby create a turbulent swirling action.

8. A mixing device, comprising:

a mixing chamber having opposing end walls, a generally cylindrical side wall, and an axis coaxial with the cylindrical side wall;

means for receiving a first fluid conduit in one end wall, the first fluid conduit having a first fluid port and wherein the first conduit is angled with respect to the mixing chamber axis to direct fluid from the first conduit toward the side wall;

a second fluid conduit joining the mixing chamber at a second fluid port formed in the cylindrical side wall, the second fluid conduit offset with respect to the mixing chamber to direct a fluid flow from the second conduit through the second port along the side wall of the mixing chamber and around the mixing chamber axis to thereby create a swirling action as fluid is injected into the mixing chamber from the second conduit; and a third fluid conduit joining the mixing chamber at a third port in the opposite end wall.

9. A device as in claim 8 wherein the third conduit is generally parallel to the mixing chamber axis.

10. A device as in claim 8 wherein the third port is offset with respect to the axis in the opposite end wall.

11. A device as in claim 8 including a fourth conduit intersecting the third conduit, center lines of the third and fourth conduit being offset.

12. A device as claimed in claim 8 wherein the second conduit is offset at less than a tangent with respect to the mixing chamber to direct a fluid flow from the second conduit through the second port partially toward an internally extended portion of the first fluid conduit to thereby create a turbulent swirling action.

13. A sample injection cell adapted to receive a probe having a tip, the cell comprising:

an open end adapted to receive the probe tip;

a mixing chamber having opposing end walls, a generally cylindrical side wall, and an axis coaxial with the cylindrical side wall;

means for receiving the probe tip in one end wall of the mixing chamber, the probe tip including a first fluid port;

a second fluid conduit joining the mixing chamber at a second fluid port formed in the cylindrical side wall, the second fluid conduit being offset with respect to the mixing chamber and being located so that the probe tip, when located in the wall, is below the second fluid conduit and the second fluid conduit acts to direct a fluid flow from the second conduit through the second port substantially along the side wall of the mixing chamber and around the mixing chamber axis to thereby create a swirling action as fluid is injected into the mixing chamber from the second conduit; and a third fluid conduit joining the mixing chamber at a third port in the opposite end wall.

14. A device as in claim 13 wherein the third conduit is generally parallel to the mixing chamber axis.

15. A device as in claim 14 wherein the third port is offset with respect to the axis in the opposite end wall.

16. A device as in claim 15 including a fourth conduit intersecting the third conduit, center lines of the third and fourth conduit being offset.

17. A device as in claim 13 wherein the third port is offset with respect to the axis in the opposite end wall.

18. A device as in claim 13 including a fourth conduit intersecting the third conduit, center lines of the third and fourth conduit being offset.

19. A device as in claim 13 wherein the probe is angled with respect to the mixing chamber axis to direct fluid from the probe toward the side wall.

20. A device as claimed in claim 13 wherein the second conduit is offset at less than a tangent with respect to the mixing chamber to direct a fluid flow from the second conduit through the second port partially toward an internally extended portion of the probe tip to thereby create a turbulent swirling action.

21. A cell as claimed in claim 13 wherein the probe tip is at least level with an upper wall portion of the second conduit.

22. A cell as claimed in claim 13 wherein the probe tip is at least level with a bottom wall portion of the second conduit.

23. An improved fluid mixing device comprising:

a mixing chamber having opposing end walls, a generally cylindrical side wall, and an axis coaxial with the cylindrical side wall;

a first fluid conduit joining the mixing chamber at a first fluid port, the first fluid port being in one of the end walls and being for permitting fluid to flow into the chamber;

a second fluid conduit joining the mixing chamber at a second fluid port formed in the cylindrical side wall, the second fluid conduit offset with respect to the mixing chamber to direct a fluid flow from the second conduit through the second port substantially between the side wall and the axis of the mixing chamber and around the mixing chamber axis to thereby create a swirling action as fluid is injected into the mixing chamber from the second conduit;

a third fluid conduit joining the mixing chamber at a third port in the opposite end wall and wherein the third port is offset with respect to the axis in the opposite end wall, and wherein the mixing chamber is free of any rotating mechanical mixing means and wherein fluid mixing is effected by the interaction of fluid flow from the first fluid conduit and the fluid from the second fluid conduit.

24. A device as in claim 23 wherein the third conduit is generally parallel to the mixing chamber axis.

25. A device as in claim 23 including a fourth conduit intersecting the third conduit, center lines of the third and fourth conduit being offset.

26. A device as in claim 23 wherein the first conduit includes an extending portion that extends into the mixing chamber and the first port is at an end of the extending portion.

27. A device as claimed in claim 23 wherein the second fluid conduit is located above a probe tip.

28. An improved fluid mixing device comprising:

a mixing chamber having opposing end walls, a generally cylindrical side wall, and an axis coaxial with the cylindrical side wall;

a first fluid conduit joining the mixing chamber at a first fluid port, the first fluid port being in one of the end walls and being for fluid to flow into the chamber;

a second fluid conduit joining the mixing chamber at a second fluid port formed in the cylindrical side wall, the second fluid conduit offset with respect to the mixing chamber to direct a fluid flow from the second conduit through the second port substantially along the side wall of the mixing chamber and around the mixing chamber axis to thereby create a swirling action as fluid is injected into the mixing chamber from the second conduit; and a third fluid conduit joining the mixing chamber at a third port in the opposite end wall and wherein the third port is offset with respect to the axis in the opposite end wall; and the first conduit including an extending portion that extends into the mixing chamber and wherein the first port is at an end of the extending portion, and wherein the first conduit is angled with respect to the mixing chamber axis to direct fluid from the first conduit toward the side wall.

29. A mixing device, comprising:

a mixing chamber having opposing end walls, a generally cylindrical side wall, and an axis coaxial with the cylindrical side wall;

means for receiving a first fluid conduit in one end wall, the first fluid conduit having a first fluid port;

a second fluid conduit joining the mixing chamber at a second fluid port formed in the cylindrical side wall, the second fluid conduit being offset with respect to the mixing chamber and being located so that the first fluid port is located at least level with the second fluid conduit, and the second fluid acts to direct a fluid flow from the second conduit through the second port substantially between the side wall and the axis of the mixing chamber and around the mixing chamber axis to thereby create a swirling action as fluid is injected into the mixing chamber from the second conduit; and a third fluid conduit joining the mixing chamber at a third port in the opposite end wall and wherein the third port is offset with respect to the axis of the opposite end wall.

30. A mixing device, comprising:

a mixing chamber having opposing end walls, a generally cylindrical side wall, and an axis coaxial with the cylindrical side wall;

means for receiving a first fluid conduit in one end wall, the first fluid conduit having a first fluid port;

a second fluid conduit joining the mixing chamber at a second fluid port formed in the cylindrical side wall, the second fluid conduit being offset with respect to the mixing chamber and being located so that the first fluid port is located at least level with the second fluid conduit, and the second fluid acts to direct a fluid flow from the second conduit through the second port substantially between the side wall and the axis of the mixing chamber and around the mixing chamber axis to thereby create a swirling action as fluid is injected into the mixing chamber from the second conduit;

a third fluid conduit joining the mixing chamber at a third port in the opposite end wall;

a fourth conduit intersecting the third conduit, center lines of the third and fourth conduits being offset, and wherein the mixing chamber is free of any rotating mechanical mixing means and wherein fluid mixing is effected by the intersection of fluid flow from the first fluid conduit and the fluid from the second fluid conduit.

31. A device as claimed in claim 30 wherein the second fluid conduit is located above the first fluid port.

32. A sample injection cell adapted to receive a probe having a tip, the cell comprising:

an open end adapted to receive the probe tip;

a mixing chamber having opposing end walls, a generally cylindrical side wall, and an axis coaxial with the cylindrical side wall;

means for receiving the probe tip in one end wall of the mixing chamber, the probe tip including a first fluid port and wherein the probe tip is angled with respect to the mixing chamber axis to direct fluid from the probe tip toward the side wall;

a second fluid conduit joining the mixing chamber at a second fluid port formed in the cylindrical side wall, the second fluid conduit offset with respect to the mixing chamber to direct a fluid flow from the second conduit through the second port along the side wall of the mixing chamber and around the mixing chamber axis to thereby create a swirling action as fluid is injected into the mixing chamber from the second conduit; and a third fluid conduit joining the mixing chamber at a third port in the opposite end wall.

33. A device as in claim 32 wherein the third conduit is generally parallel to the mixing chamber axis.

34. A device as in claim 33 wherein the third port is offset with respect to the axis in the opposite end wall.

35. A device as in claim 32 wherein the third port is offset with respect to the axis in the opposite end wall.

36. A device as in claim 32 including a fourth conduit intersecting the third conduit, center lines of the third and fourth conduit being offset.

37. A device as in claim 36 including a fourth conduit intersecting the third conduit, center lines of the third and fourth conduit being offset.

38. A device as claimed in claim 32 wherein the second fluid conduit is located above the first fluid port.

39. A mixing device comprising:

a mixing chamber having opposing end walls, a generally cylindrical side wall, and an axis coaxial with the cylindrical side wall;

means for receiving a first fluid conduit in one end wall, the first fluid conduit having a first fluid port for permitting fluid to flow into the chamber;

a second fluid conduit joining the mixing chamber at a second fluid port formed in the cylindrical side wall, the second fluid conduit being offset with respect to the mixing chamber and being located so that the first fluid port is located at least level with the second fluid conduit and the second fluid acts to direct a fluid flow from the second conduit through the second port substantially between the side wall and the axis of the mixing chamber and around the mixing chamber axis to thereby create a swirling action as fluid is injected into the mixing chamber from the second conduit;

a third fluid conduit joining the mixing chamber at a third port in the opposite end wall and wherein the third port is offset with respect to the axis in the opposite end wall; and wherein the mixing chamber is free of any rotating mechanical mixing means and wherein fluid mixing is effected by the interaction of fluid flow from the first fluid conduit and the fluid from the second fluid conduit.

40. A mixing device comprising:

a mixing chamber having opposing end walls, a generally cylindrical side wall, and an axis coaxial with the cylindrical side wall;

means for receiving a first fluid conduit in one end wall, the first fluid conduit having a first fluid port for permitting fluid to flow into the chamber;

a second fluid conduit joining the mixing chamber at a second fluid port formed in the cylindrical side wall, the second fluid conduit being offset with respect to the mixing chamber and being located so that the first fluid port is located at least level with the second fluid conduit and the second fluid acts to direct a fluid flow from the second conduit through the second port substantially between the side wall and the axis of the mixing chamber and around the mixing chamber axis to thereby create a swirling action as fluid is injected into the mixing chamber from the second conduit;

a third fluid conduit joining the mixing chamber at a third port in the opposite end wall;

a fourth conduit intersecting the third conduit, center lines of the third and fourth conduit being offset; and wherein the mixing chamber is free of any rotating mechanical mixing means and wherein fluid mixing is effected by the interaction of fluid flow from the first fluid conduit and the fluid from the second fluid conduit.

41. A sample injection cell adapted to receive a probe having a tip, the cell comprising:

an open end adapted to receive the probe tip;

a mixing chamber having opposing end walls, a generally cylindrical side wall, and an axis coaxial with the cylindrical side wall;

means for receiving the probe tip in one end wall of the mixing chamber, the probe tip including a first fluid port for a first liquid to enter the mixing chamber;

a second fluid conduit joining the mixing chamber at a second fluid port formed in the cylindrical side wall for a second liquid to enter the chamber, the second fluid conduit being offset with respect to the mixing chamber to direct a fluid flow from the second conduit through the second port substantially along the side wall of the mixing chamber and around the mixing chamber axis to thereby create a swirling action as fluid is injected into the mixing chamber from the second conduit and mixing with liquid from the probe; and a third fluid conduit joining the mixing chamber at a third port in the opposite end wall.

42. An improved fluid mixing device comprising:

a mixing chamber having opposing end walls, a generally cylindrical side wall, and an axis coaxial with the cylindrical side wall;

a first fluid conduit joining the mixing chamber at a first fluid port for a first liquid to enter the mixing chamber, the first fluid port being in one of the end walls and wherein the first conduit is angled with respect to the mixing chamber axis;

a second fluid conduit joining the mixing chamber at a second fluid port formed in the cylindrical side wall, the second fluid conduit being offset with respect to the mixing chamber to direct a second liquid flow from the second conduit through the second port substantially between the side wall and the axis of the mixing chamber and around the mixing chamber axis to thereby create a liquid swirling and mixing action between the first and second liquids as the second liquid is injected into the mixing chamber from the second conduit; and a third fluid conduit joining the mixing chamber at a third port.

43. A mixing device, comprising:

a mixing chamber having opposite end walls, a generally cylindrical side wall, and an axis coaxial with the cylindrical side wall;

means for receiving a first fluid conduit in one end wall, the first fluid conduit having a first fluid port and wherein the first conduit is angled with respect to the mixing chamber axis to direct fluid from the first conduit toward the side wall;

a second fluid conduit joining the mixing chamber at a second fluid port formed in the cylindrical side wall, the second fluid conduit offset with respect to the mixing chamber to direct a fluid flow from the second conduit through the second port substantially along the side wall of the mixing chamber and around the mixing chamber axis to thereby create a swirling action as fluid is injected into the mixing chamber from the second conduit; and a third fluid conduit joining the mixing chamber at a third port.

44. A sample injection cell adapted to receive a probe having a tip, the cell comprising:

an open end adapted to receive the probe tip;

a mixing chamber having opposing end walls, a generally cylindrical side wall, and an axis coaxial with the cylindrical side wall;

means for receiving the probe tip in one end wall of the mixing chamber, the probe tip including a first fluid port and wherein the probe tip is angled with respect to the mixing chamber axis;

a second fluid conduit joining the mixing chamber at a second fluid port formed in the cylindrical side wall, the second fluid conduit offset with respect to the mixing chamber to direct a fluid flow from the second conduit through the second port substantially along the side wall of the mixing chamber and around the mixing chamber axis to thereby create a swirling action as fluid is injected into the mixing chamber from the second conduit; and a third fluid conduit joining the mixing chamber at a third port.

45. A sample injection cell adapted to receive a probe having a tip, the cell comprising:

an open end adapted to receive the probe tip;

a mixing chamber having opposing end walls, a generally cylindrical side wall, and an axis coaxial with the cylindrical side wall;

means for receiving the probe tip in one end wall of the mixing chamber, the probe tip including a first fluid port;

a second fluid conduit joining the mixing chamber at a second fluid port formed in the cylindrical side wall, the second fluid conduit being offset with respect to the mixing chamber to direct a fluid flow from the second conduit through the second port substantially along the side wall of the mixing chamber and around the mixing chamber axis to thereby create a swirling action as fluid is injected into the mixing chamber from the second conduit, the second fluid port being located such that, when the probe tip is received by the receiving means, the first fluid port is further from the one end wall than the second fluid port; and a third fluid conduit joining the mixing chamber at a third port in this opposite end wall.

* * * * *

UNITED STATES PATENT AND TRADEMARK OFFICE
CERTIFICATE OF CORRECTION

PATENT NO. : 5,230,253
DATED : July 27, 1993
INVENTOR(S) : Blough, Jr., et al.

It is certified that error appears in the above-identified patent and that said Letters Patent is hereby corrected as shown below:

Col. 6, lines 25 & 26, "is angled with respect the first conduit" should read --is angled with respect to the mixing chamber axis to direct fluid from the first conduit.--

Signed and Sealed this
Twenty-second Day of March, 1994

Attest:

BRUCE LEHMAN

*Attesting Officer* *Commissioner of Patents and Trademarks*